United States Patent
Salgaonkar et al.

(10) Patent No.: US 9,016,375 B2
(45) Date of Patent: Apr. 28, 2015

(54) BREAKING DIUTAN WITH OXALIC ACID AT 180° F TO 220° F

(75) Inventors: Lalit P. Salgaonkar, Pune (IN); Prerana U. Suryawanshi, Pune (IN); Achala V. Danait, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 784 days.

(21) Appl. No.: 13/307,968

(22) Filed: Nov. 30, 2011

(65) Prior Publication Data
US 2013/0133892 A1 May 30, 2013

(51) Int. Cl.
*C09K 8/575* (2006.01)
*C09K 8/035* (2006.01)
*C09K 8/514* (2006.01)
*C09K 8/90* (2006.01)

(52) U.S. Cl.
CPC ............... *C09K 8/035* (2013.01); *C09K 8/514* (2013.01); *C09K 8/5758* (2013.01); *C09K 8/90* (2013.01); *C09K 2208/26* (2013.01)

(58) Field of Classification Search
CPC ........ C09K 8/62; C09K 8/92; C09K 2208/26; C09K 8/68; C09K 2208/24; C09K 8/035; C09K 8/60; C09K 8/90; Y10S 507/921
See application file for complete search history.

(56) References Cited

U.S. PATENT DOCUMENTS

| | | | | |
|---|---|---|---|---|
| 4,917,186 A | * | 4/1990 | Mumallah | 166/295 |
| 5,062,484 A | * | 11/1991 | Schroeder et al. | 166/278 |
| 5,082,056 A | * | 1/1992 | Tackett, Jr. | 166/295 |
| 5,102,558 A | * | 4/1992 | McDougall et al. | 507/260 |
| 5,217,074 A | * | 6/1993 | McDougall et al. | 166/300 |
| 5,580,844 A | | 12/1996 | Swarup et al. | |
| 6,729,404 B2 | | 5/2004 | Nguyen et al. | |
| 6,877,563 B2 | | 4/2005 | Todd et al. | |
| 6,962,200 B2 | | 11/2005 | Nguyen et al. | |
| 7,021,383 B2 | | 4/2006 | Todd et al. | |
| 7,131,491 B2 | | 11/2006 | Blauch et al. | |
| 7,159,659 B2 | | 1/2007 | Welton et al. | |
| 7,165,617 B2 | * | 1/2007 | Lord et al. | 166/308.5 |
| 7,547,665 B2 | | 6/2009 | Welton et al. | |
| 2003/0166472 A1 | | 9/2003 | Pursley et al. | |
| 2005/0148475 A1 | * | 7/2005 | Maresh et al. | 507/111 |
| 2005/0261138 A1 | | 11/2005 | Robb et al. | |
| 2006/0041060 A1 | | 2/2006 | George et al. | |
| 2006/0121578 A1 | | 6/2006 | Bower et al. | |
| 2006/0131012 A1 | | 6/2006 | Blauch et al. | |
| 2006/0166836 A1 | | 7/2006 | Pena et al. | |
| 2006/0166837 A1 | | 7/2006 | Lin et al. | |
| 2006/0178276 A1 | | 8/2006 | Pena et al. | |
| 2006/0180309 A1 | | 8/2006 | Welton et al. | |
| 2006/0180310 A1 | | 8/2006 | Welton et al. | |
| 2006/0183646 A1 | | 8/2006 | Welton et al. | |
| 2006/0199201 A1 | | 9/2006 | Harding et al. | |
| 2006/0243449 A1 | | 11/2006 | Welton et al. | |
| 2006/0247135 A1 | | 11/2006 | Welton | |
| 2007/0281868 A1 | | 12/2007 | Pauls et al. | |
| 2008/0190609 A1 | * | 8/2008 | Robb et al. | 166/279 |
| 2008/0234147 A1 | | 9/2008 | Li et al. | |
| 2008/0271891 A1 | | 11/2008 | Hutchins et al. | |
| 2011/0036583 A1 | * | 2/2011 | Willberg et al. | 166/308.1 |

FOREIGN PATENT DOCUMENTS

WO WO2006117517 A2 11/2006

OTHER PUBLICATIONS

International Search Report and Written Opinion for PCT/US2012/064608 issued Jan. 28, 2013.

* cited by examiner

*Primary Examiner* — Angela M DiTrani
(74) *Attorney, Agent, or Firm* — Holly Soehnge; Baker Botts L.L.P.

(57) ABSTRACT

A method of treating a portion of a well of a well. The method includes the step of forming a treatment fluid comprising: (i) a continuous aqueous phase; (ii) a viscosity increasing agent selected from the group consisting of diutan, clarified diutan, water-soluble derivative of diutan, and any combination thereof, wherein the viscosity-increasing agent is dissolved in the aqueous phase; and (iii) a breaker comprising oxalic acid, wherein the oxalic acid is dissolved in the aqueous phase. The viscosity of the treatment fluid breaks to less than 3.0 cP in less than 72 hours when in a temperature range of 180° F. (82.2° C.) to 220° F. (104.4° C.). The method also includes the steps of introducing the treatment fluid into the portion of the well and flowing back from the portion of the well.

19 Claims, No Drawings

BREAKING DIUTAN WITH OXALIC ACID AT 180° F TO 220° F

CROSS-REFERENCE TO RELATED APPLICATIONS

Not applicable.

BACKGROUND

1. Technical Field

The inventions are in the field of producing crude oil or natural gas from subterranean formations. More particularly, the present invention relates to methods of reducing the viscosity of well treatment fluids that include diutan or diutan derivative.

2. Background Art

Producing Oil and Gas

To produce oil or gas from a reservoir, a well is drilled into a subterranean formation, which may be the reservoir or adjacent to the reservoir. A well includes a wellhead and at least one wellbore from the wellhead penetrating the earth. Typically, a wellbore must be drilled thousands of feet into the earth to reach a hydrocarbon-bearing formation. Generally, the greater the depth of the formation, the higher the "static" pressure and temperature of the formation.

Generally, well services include a wide variety of operations that may be performed in wells, such as drilling, cementing, completion, and intervention. These well services are designed to facilitate or enhance the production of desirable fluids from or through a subterranean formation.

Drilling, completion, and intervention operations can include various types of treatments that are commonly performed in a wellbore or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production. Still other types of completion or intervention treatments include, but are not limited to, damage removal, formation isolation, wellbore cleanout, scale removal, and scale control.

As used herein, the word "treatment" refers to any treatment for changing a condition of a portion of a wellbore or an adjacent subterranean formation, however, the word "treatment" does not necessarily imply any particular treatment purpose.

A treatment usually involves introducing a treatment fluid into a well. As used herein, a "treatment fluid" is a fluid used in a treatment. Unless the context otherwise requires, the word "treatment" in the term "treatment fluid" does not necessarily imply any particular treatment or action by the fluid. If a treatment fluid is to be used in a relatively small volume, for example less than about 200 barrels, it is sometimes referred to in the art as a wash, dump, slug, or pill.

As used herein, a "treatment zone" refers to an interval of rock along a wellbore into which a treatment fluid is directed to flow from the wellbore. Further, as used herein, "into a treatment zone" means into and through the wellhead and, additionally, through the wellbore and into the treatment zone.

The following are some general descriptions of common well treatments and associated treatment fluids. Of course, other well treatments and treatment fluids are known in the art.

Sand Control & Gravel Packing

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, gravel is selected for having properties of physical integrity and chemical stability. An example of a commonly used gravel packing material is sand having an appropriate particulate size range. For various purposes, the gravel particulates also may be coated with certain types of materials, including resins, tackifying agents, and the like. For example, a tackifying agent can help with fines and resins can help to enhance conductivity (e.g., fluid flow) through the particulate pack.

In one common type of gravel packing, a mechanical screen is placed in the wellbore and the surrounding annulus is packed with a particulate of a larger specific size designed to prevent the passage of formation sand or other fines. It is also common, for example, to gravel pack after a fracturing procedure, and such a combined procedure is sometimes referred to as a "frac-packing."

A screenout is a condition encountered during some gravel-pack operations wherein the treatment area cannot accept further packing gravel (larger sand). Under ideal conditions, this should signify that the entire void area has been successfully packed with the gravel. However, if screenout occurs earlier than expected in the treatment, it may indicate an incomplete treatment and the presence of undesirable voids within the treatment zone.

Water-Based or Oil-Based Fluids

A fluid inherently has a continuous phase. Preferably, the continuous phase is a liquid under standard laboratory conditions. As used herein, "water-based" regarding a fluid means that water or an aqueous solution is the dominant material by weight of the continuous phase of the substance. In contrast, "oil-based" means that oil is the dominant material by weight of the continuous phase of the substance.

Fluids and Apparent Viscosity

A fluid can be a single phase or a dispersion. In general, a fluid is an amorphous substance that is or has a continuous phase of particles (e.g., molecules) that are smaller than about 1 micrometer that tends to flow and to conform to the outline of its container.

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high stresses.

Most well fluids are non-Newtonian fluids. Accordingly, the apparent viscosity of a fluid applies only under a particular set of conditions including shear stress versus shear rate, which must be specified or understood from the context. In the oilfield and as used herein, unless the context otherwise requires it is understood that a reference to viscosity is actually a reference to an apparent viscosity. Apparent viscosity is commonly expressed in units of centipoise ("cP").

Like other physical properties, the viscosity of a Newtonian fluid or the apparent viscosity of a non-Newtonian fluid may be highly dependent on the physical conditions, primarily temperature and pressure. Accordingly, unless otherwise stated, the viscosity or apparent viscosity of a fluid is measured under Standard Laboratory Conditions.

There are numerous ways of measuring and modeling viscous properties, and new developments continue to be made. The methods depend on the type of fluid for which viscosity is being measured. A typical method for quality assurance or quality control (QA/QC) purposes uses a couette device, such as a Fann Model 35 or 50 viscometer, that measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (i.e., particles having a diameter larger than about 74 microns), would interfere with the measurement on some types of measuring devices. Therefore, the viscosity of a fluid containing such solid particulate is usually inferred and estimated by measuring the viscosity of a test fluid that is similar to the treatment fluid without any particulate that would otherwise be included. However, as suspended particles (which can be solid, gel, liquid, or gaseous bubbles) usually affect the viscosity of a fluid, the actual viscosity of a suspension is usually somewhat different from that of the continuous phase.

Viscosity-Increasing Agents

A viscosity-increasing agent can be used to increase the ability of a fluid. A viscosity-increasing agent can be used for various purposes, such as to help carry a particulate material or to help control and direct the penetration of the fluid in a subterranean formation.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Water-Soluble Polymers for Increasing Viscosity

Well treatment fluids are usually water-based. Efficient and inexpensive viscosity-increasing agents for water include certain classes of water-soluble polymers.

The viscosity of water-based treatment fluids for carrying a particulate usually made viscous by the addition of about 10 pounds to about 80 pounds (lbs) of water-soluble polymer per 1,000 gallons (Mgal) of water (equivalent to about 1.2 g/L to about 9.6 g/L).

As will be appreciated by a person of skill in the art, the dispersability or solubility in water of a certain kind of polymeric material may be dependent on the salinity or pH of the water. Accordingly, the salinity or pH of the water can be modified to facilitate the dispersability or solubility of the water-soluble polymer. In some cases, the water-soluble polymer can be mixed with a surfactant to facilitate its dispersability or solubility in the water or salt solution utilized.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (e.g., polyacrylamide). The most common water-soluble polysaccharides employed in well treatments are guar and its derivatives.

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

As used herein, a "polysaccharide" can broadly include a modified or derivative polysaccharide. As used herein, "modified" or "derivative" means a compound or substance formed by a chemical process from a parent compound or substance, wherein the chemical skeleton of the parent is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

Crosslinking Agents

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

Sometimes, however, crosslinking is undesirable, as it may cause the polymeric material to be more difficult to break and it may leave an undesirable residue in the formation. A fluid with a non-crosslinked polymeric viscosity-increasing agent is sometimes referred to as a "linear gel."

Breaking Viscosity

After a treatment fluid is placed where desired in the well and for the desired time, the fluid usually must be removed from the wellbore or the formation. For example, when a viscosified fluid is used for gravel packing, the viscosified fluid must be removed from the gravel pack. To accomplish this removal, the viscosity of the treatment fluid must be reduced to a very low viscosity, preferably near the viscosity of water, for optimal removal from the well.

Reducing the viscosity of a viscosified fluid is referred to as breaking the fluid. Chemicals used to reduce the viscosity of treatment fluids are called breakers. Other types of viscosified well fluids also need to be broken for removal from the wellbore or subterranean formation.

No particular mechanism is necessarily implied by the term. For example, a breaker can reduce the molecular weight of a water-soluble polymer by cutting the long polymer chain. As the length of the polymer chain is cut, the viscosity of the fluid is reduced. For instance, reducing the guar polymer molecular weight to shorter chains having a molecular weight of about 10,000 converts the fluid to near water-thin viscosity. This process can occur independently of any crosslinking bonds that may exist between polymer chains. In the case of a crosslinked viscosity-increasing agent, for example, one way to diminish the viscosity is by breaking the crosslinks.

Breakers must be selected to meet the needs of each situation. First, it is important to understand the general performance criteria of breakers. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained. For example, a typical gravel pack break criteria is a minimum 8-hour break time at the design temperature.

A breaker should be selected based on its performance in the temperature, pH, time, and desired viscosity profile for each specific treatment.

Fluids viscosified with a multi-chain polysaccharide, such as diutan and derivatives, can be more difficult to break than fluids viscosified with a single-chain polysaccharide.

As disclosed in U.S. Pat. No. 7,547,665, which is incorporated herein by reference, the breaking of diutan with acids has been proposed. However, the specific acids previously disclosed tend to break the diutan too quickly or too slowly in a desired temperature range of 180° F. to 220° F. It is desirable to have a breaker operative for diutan within this temperature range.

SUMMARY OF THE INVENTIONS

The inventions are in the field of producing crude oil or natural gas from subterranean formations. More specifically, the inventions generally relate to methods and compositions for treating a subterranean formation. More particularly, the present invention relates to methods of reducing the viscosity of treatment fluids that include diutan or a diutan derivative.

In one embodiment, the present invention provides a method of treating a portion of a well, the method including the steps of:

(a) forming a treatment fluid, wherein the treatment fluid includes:
  (i) an aqueous phase;
  (ii) a viscosity-increasing agent selected from the group consisting of diutan, one or more clarified diutans, one or more water-soluble derivatives of diutan, and any combination thereof, wherein the viscosity-increasing agent is dissolved in the aqueous phase to the extent of at least 0.1% by weight of the water; and
  (iii) a breaker comprising oxalic acid, wherein the oxalic acid is dissolved in the aqueous phase to the extent of at least 0.1% by weight of the water;
  wherein the viscosity-increasing agent is not cross-linked;
  wherein the treatment fluid does not include a cross-linking agent for the viscosity-increasing agent;
  wherein the viscosity of the treatment fluid is equal or greater than 5.0 cP;
  wherein the viscosity of the treatment fluid breaks to less than 3.0 cP in less than 72 hours when in a temperature range of 180° F. (82.2° C.) to 220° F. (104.4° C.);

(b) introducing the treatment fluid into the portion of the well, wherein the design temperature of the portion of the well is greater than 180° F. (82.2° C.); and (c) flowing back from the portion of the well,
  wherein the step of flowing back is within 72 hours of the step of introducing; and
  wherein the step of flowing back is before contacting the portion of the well with any different treatment fluid that is reactive to degrade the viscosity-increasing agent of the treatment fluid.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DESCRIPTION OF PREFERRED EMBODIMENTS AND BEST MODE

General Definitions and Usages

As used herein, the words "comprise," "have," "include," and all grammatical variations thereof are each intended to have an open, non-limiting meaning that does not exclude additional elements or steps.

While compositions and methods are described in terms of "comprising," "containing," or "including" various components or steps, the compositions and methods also can "consist essentially of" or "consist of" the various components and steps. The indefinite articles "a" or "an", as used in the claims, are defined herein to mean one or more than one of the element that it introduces. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values.

The terms in herein have their plain, ordinary meaning unless otherwise explicitly and clearly defined. If there is any conflict in the usages of a word or term in this specification and one or more patent(s) or other documents that may be incorporated herein by reference, the definitions that are consistent with this specification should be adopted.

As used herein, if not otherwise specifically stated or unless the context otherwise clearly requires, the physical state or phase of a substance (or mixture of substances) and other physical properties are determined at a temperature of 77° F. (25° C.) and a pressure of 1 atmosphere (Standard Laboratory Conditions) under no shear.

As used herein, if not otherwise specifically stated or unless the context otherwise clearly requires, a substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersability, or solubility of a substance in water can be dependent on the salinity, pH, or other substances in the water. Accordingly, the salinity, pH, and additive selection of the water can be modified to facilitate the hydratability, dispersability, or solubility of a substance in aqueous solution.

As used herein, unless otherwise specified or unless the context otherwise clearly requires, the apparent viscosity of a fluid (excluding any suspended solid particulate larger than silt) is measured with a Fann Model 35 type viscometer with an F1 spring, B1 bob, and R1 rotor at a shear rate of 511 1/s and at 77° F. (25° C.) and a pressure of 1 atmosphere. For reference, the viscosity of pure water is about 1 cP.

As used herein, a substance is considered to be a viscous fluid if it has an apparent viscosity greater than 5 cP.

As used herein, a substance is considered to be a fluid if it has an apparent viscosity less than 5,000 cP (independent of any gel characteristic).

In the oil industry, the term "gel" is used broadly to refer to a fluid viscosified with a thickening or gelling agent, regardless of whether it meets the technical definition for the physical state of a gel. As used herein, unless otherwise specified or the context otherwise requires, a substance referred to as a "gel" is subsumed by the concept of "fluid" if it is a pumpable fluid.

As used herein, the viscosity of a viscous fluid is considered to break or be broken if the viscosity is reduced to 3.0 cP or less (at 511 sec-1 shear on a Fann 35 viscometer).

As used herein the term "design temperature" refers to an estimate or measurement of the actual temperature at the down hole environment at the time of the treatment. That is, design temperature takes into account not only the bottom hole static temperature ("BHST"), but also the effect of the temperature of the treatment fluid on the BHST during treatment. Because treatment fluids may be considerably cooler than BHST, the difference between the two temperatures can be quite large. Ultimately, if left undisturbed, a subterranean formation will return to the BHST.

As used herein, unless otherwise specified or unless the context otherwise clearly requires, any ratio or percentage means by weight.

As used herein, unless otherwise specified or unless the context otherwise clearly requires, the phrase "by weight of the water" means the weight of the water of the continuous phase of the fluid without the weight of any viscosity-increasing agent, salt, suspended particulate, or other materials or additives that may be present in the water.

Unless otherwise specified, any doubt regarding whether units are in U.S. or Imperial units, where there is any difference, U.S. units are intended herein. For example, "gal/Mgal" means U.S. gallons per thousand U.S. gallons.

The micrometer (μm) may sometimes referred to herein as a micron.

As used herein, unless otherwise specified or unless the context otherwise clearly requires, "about" regarding a number or measurement means within 10% of the number or measurement.

General Objectives

Fluids viscosified with diutan are commonly used in gravel packing operations at temperatures from 180° F. to 270° F.

Oxidizing breakers have not been able to provide a complete break of a diutan polymer backbone at temperatures below 200° F. (93° C.). Reduced regained-permeability values have been seen when oxidizing breakers were used at lower temperatures. Above 200° F. (93° C.), however, oxidizing breakers cause too rapid of a viscosity reduction rate for diutan.

U.S. Pat. No. 7,584,791 issued Sep. 8, 2009 discloses a method of using organic acids such as formic and acetic acids to break diutan fluids at temperatures within the range of 180° F. to 270° F. Breaking the diutan polymer has been achieved by adjusting the pH of the gravel-pack fluid with internal breakers like formic acid and acetic acid. Regained permeability values were excellent when fluid comprising of diutan polymer was broken by adjusting the fluid pH with these acids to the proper level.

The existing acid breaker systems applicable to diutan from 180 to 220° F. uses formic acid and initiate breaker action by reducing the pH of the system to a level sufficient to degrade the polymer backbone. At effective concentrations, formic acid provides a break time of 2 to 3 days in the temperature range of 180° F. to 220° F. Breaker times shorter than 2 to 3 days can be achieved using higher formic acid loadings. However, higher formic acid loadings severely affect the particulate suspension properties of fluids viscosified with diutan at temperatures from 180° F. to 220° F. This makes diutan viscosified fluids with higher acid loadings unsuitable for applications that include suspending particulate, such as gravel packing.

In addition, formic acid is a fuming liquid at room temperature 77° F. with a flash point of 156° F. and a flammability rating of 2 on the NFPA scale. Its reactivity on the NFPA scale is 1. In addition, formic acid is classified as an irritant and corrosive with a risk phrase of R36/38. Due to these properties, use of formic acid can raise many safety concerns, especially in field applications.

Field requirements frequently demand breaking in a relative short time and without severely affecting the sand suspension properties of diutan viscosified fluids at temperatures from 180° F. to 220° F. In such cases, different breaker systems will be required.

The present invention relates to methods of reducing the viscosity of treatment fluids that comprise a continuous aqueous phase, a viscosity-increasing agent in the aqueous phase, and a breaker, wherein the viscosity-increasing agent comprises diutan, clarified diutan, a diutan derivative, or any combination thereof, and wherein the breaker comprises dissolved oxalic acid in the aqueous phase.

The present invention provides a very simple, effective, and safer means of breaking treatment fluids viscosified with a diutan or the like at temperatures within the range of 180° F. to 220° F.

A purpose of this invention is to provide a well treatment including forming a treatment fluid comprising a continuous phase including water, a viscosity-increasing agent hydrated in the water, and a breaker, wherein the viscosity-increasing agent includes a diutan polymer backbone and wherein the breaker includes oxalic acid that is dissolved in water. The water can include any one or more of freshwater, brackish water, saltwater, seawater, or brine. The fluid is adapted to have a relatively short break times at temperatures in the range of 180° F. to 220° F. More preferably, the breaker is effective in a temperature range of 180° F. to 200° F. A particularly useful application for this invention is gravel packing.

As used herein, a short break time means less than 2 days, preferably less than 24 hours, and more preferably less than 16 hours at a temperature within the temperature range of 180° F. to 220° F. Nevertheless, it is also desirable that the break time not be too short, that is, preferably at least 1 hour, more preferably at least 2 hours, and most preferably at least 4 hours. Accordingly, a short break time includes break times in the range of 1 hour to 2 days at a temperature within the temperature range of 180° F. to 220° F.

The present invention disclosure uses a simple breaker for a diutan polymer backbone comprising oxalic acid in a temperature range of 180° F. to 220° F. The oxalic acid can be effective for diutan in this temperature range as a one-component breaker.

Formic acid has an acid dissociation constant (pKa) of 3.77, while oxalic acid has a pKa1 of 1.38. Without being limited by any theory, this indicates that oxalic acid is a much stronger acid than formic acid and has a greater potential of lowering the pH to initiate breaker action on the viscosity-increasing agent comprising a diutan.

Compared to formic acid, the present invention uses a breaker including at least oxalic acid, which is a colorless solid at room temperature 77° F. Oxalic acid has a flash point of 372° F. to 376° F., which is much higher than that of formic acid (156° F.). Oxalic acid has a flammability rating of 1 on the NFPA scale, which is lower than that of formic acid. Oxalic acid has a reactivity of 0 on the NFPA scale, which indicates that it is more stable, compared to formic acid. In addition, oxalic acid is not assigned any risk phrase rating. Also, being a stable solid, oxalic acid will be easier to transport than formic acid, which is a fuming liquid. In view of these points, oxalic acid can serve as an excellent choice for a breaker system and comply with all safety standards.

While the methods of the present invention may be suitable for use in a variety of subterranean treatments, they may be particularly useful in treatments for subterranean formations comprising elevated temperatures, such as those above 180° F. One of the many advantages of the present invention is that it may allow for a controlled decrease in the viscosity of a viscosified treatment fluid. In some embodiments, a breaker of the present invention may be able to break a treatment fluid comprising a diutan or derivative at temperatures above 200° F., while providing satisfactory particulate suspension for a desired minimum time, e.g. 4 hours. Furthermore, in some embodiments, when the viscosified treatment fluid is broken, decreased levels of residue may be present as compared to traditional viscosified treatment fluids.

The methods of the present invention may be used in any subterranean operation involving the introduction of a treatment fluid into a subterranean formation wherein the viscosity of the treatment fluid is decreased, including, gravel-packing operations, frac-packing operations, well bore cleanout operations, and the like. In certain embodiments of the present invention, the treatment fluid may be introduced into a portion of a subterranean formation so as to create a "plug" capable of diverting the flow of fluids that are introduced to the well bore at some point after the plug has formed (e.g., other treatment fluids) to other portions of the formation. In those embodiments, the breaker then may be allowed to reduce the viscosity of the fluid within the formation's pores, which may at least partially restore the flow of fluids through that portion of the subterranean formation.

Forming a Treatment Fluid

According to the invention, the methods include the step of forming a treatment fluid, wherein the treatment fluid includes:

(i) an aqueous phase;

(ii) a viscosity-increasing agent selected from the group consisting of diutan, one or more clarified diutans, one or more water-soluble derivatives of diutan, and any combination thereof, wherein the viscosity-increasing agent is dissolved in the aqueous phase to the extent of at least 0.1% by weight of the water; and (iii) a breaker comprising oxalic acid, wherein the oxalic acid is dissolved in the aqueous phase to the extent of at least 0.1% by weight of the water;

wherein the viscosity-increasing agent is not cross-linked;
wherein the treatment fluid does not include a cross-linking agent for the viscosity-increasing agent;
wherein the viscosity of the treatment fluid is equal or greater than 5.0 cP;
wherein the viscosity of the treatment fluid breaks to less than 3.0 cP in less than 72 hours when in a temperature range of 180° F. (82.2° C.) to 220° F. (104.4° C.).

The treatment fluid may be prepared at the job site, prepared at a plant or facility prior to use, or certain components of the treatment fluid (e.g., the aqueous phase and the viscosity-increasing agent) may be pre-mixed prior to use and then transported to the job site. Certain components of the treatment fluid may be provided as a "dry mix" to be combined with a liquid or other components prior to or during introducing the treatment fluid into the subterranean formation.

Forming on the Fly

In certain embodiments, the preparation of these treatment fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing. In some embodiments of the present invention, the diutan viscosity-increasing agent may be mixed into the base fluid on the fly.

Variations in Well Fluids Over Time

Unless the specific context otherwise requires, a well fluid or treatment fluid refers to the specific properties and composition of a fluid at the time the fluid is being introduced into a well. In addition, it should be understood that, during the course of a well operation such as drilling, cementing, completion, or intervention, or during a specific treatment, the specific properties and composition of a type of well fluid can be varied or several different types of well fluids can be used. For example, the compositions can be varied to adjust viscosity or elasticity of the well fluids to accommodate changes in the concentrations of particulate to be carried down hole. It can also be desirable to accommodate expected changes in temperatures encountered by the well fluids during the course of the treatment. By way of another example, it can be desirable to accommodate the longer duration that the first treatment fluid may need to maintain viscosity before breaking compared to the shorter duration that a later-introduced treatment fluid may need to maintain viscosity before breaking. Changes in concentration of a particulate, viscosity-increasing agent, breaker, or other additives in the various treatment fluids of a treatment operation can be made in stepped changes of concentrations or ramped changes of concentrations.

Continuous Aqueous Phase

Preferably, the continuous aqueous phase of the treatment fluid is a liquid. However, it is contemplated that the continuous aqueous phase can be foamed or an emulsion.

Water of Aqueous Phase

According to the invention, the treatment fluid is preferably a water-based fluid wherein the continuous aqueous phase of the fluid is greater than 50% by weight water.

The water preferably is present in the treatment fluids suitable for use in the present invention in an amount at least sufficient to substantially hydrate the viscosity-increasing agent. In some embodiments, the aqueous phase, including the dissolved materials therein, may be present in the treatment fluids suitable for use in the present invention in an amount in the range from about 5% to 100% by volume of the treatment fluid.

Preferably, the water for use in the treatment fluid does not contain anything that would adversely interact with the other components used in accordance with this invention or with the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, brine refers to water having at least 40,000 mg/L total dissolved solids.

In some embodiments, the aqueous phase of the treatment fluid may comprise a brine. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, mixtures thereof, and the like. The brine chosen should be compatible with the formation and should have a sufficient density to provide the appropriate degree of well control. Additional salts may be added to a water source, e.g., to provide a brine, and a resulting treatment fluid, having a desired density. Brines, where used, may be of any weight.

Salts may optionally be included in the treatment fluids of the present invention for many purposes, including, for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid suitable for use in the present invention. Suitable salts include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Removal of Undesirable Crosslinking Cations

Brines suitable for use in some embodiments of the present invention may include those that comprise monovalent, divalent, or trivalent cations. Some divalent or trivalent cations, such as magnesium, calcium, iron, and zirconium, may, in some concentrations and at some pH levels, cause undesirable crosslinking of a polymeric viscosity-increasing agent. Such crosslinking may be problematic because, inter alia, it may cause filtration problems, injection problems, or causes regain permeability problems.

If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used.

Another method would be to include a chelating agent to chemically bind the problematic ions to prevent their undesirable interactions with the diutan. As used herein, the term "chelating agent" or "chelant" also refers to sequestering agents and the like. Suitable chelants include, but are not limited to, citric acid or sodium citrate. Other chelating agents also are suitable.

In some embodiments, the treatment fluid may optionally comprise a chelating agent. When added to the treatment fluids of the present invention, the chelating agent may chelate any dissolved iron (or other divalent or trivalent cation) that may be present in the aqueous fluid. Such chelating may prevent such ions from crosslinking the viscosity-increasing agent molecules.

Any suitable chelating agent may be used with the present invention. Examples of suitable chelating agents include, but are not limited to, an anhydrous form of citric acid, commercially available under the trade name "Fe-2™" Iron Sequestering Agent from Halliburton Energy Services, Inc., of Duncan, Okla. Another example of a suitable chelating agent is a solution of citric acid dissolved in water, commercially available under the trade name "Fe-2A™" buffering agent from Halliburton Energy Services, Inc., of Duncan, Okla. Other chelating agents that may be suitable for use with the present invention include, inter alia, nitrilotriacetic acid ("NTA"), any form of ethylene diamine tetracetic acid ("EDTA"), hydroxyethylethylenediaminetriacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediamindi(o-hydroxyphenylacetic) acid ("EDDHA"), glucoheptonic acid, gluconic acid, sodium citrate, phosphonic acid, salts thereof, and the like. In some embodiments, the chelating agent may be a sodium or potassium salt.

Generally, the chelating agent may be present in an amount sufficient to prevent crosslinking of the viscosity-increasing agent molecules by any free iron (or any other divalent or trivalent cation) that may be present. In one embodiment, the chelating agent may be present in an amount of from about 0.02% to about 5.0% by weight of the water in the continuous phase of the treatment fluid. In another embodiment, the chelating agent is present in an amount in the range of from about 0.02% to about 2.0% by weight of the water in the continuous phase of the treatment fluid. One of ordinary skill in the art with the benefit of this disclosure will be able to determine the proper concentration of a chelating agent for a particular application.

Viscosity-Increasing Agent Including Water-Soluble Polymer with Diutan Backbone

A viscosity-increasing agent suitable for use in the methods of the present invention is selected from the group consisting of diutan, one or more clarified diutans, one or more water-soluble derivatives of diutan, and any combination thereof. Other, additional viscosity-increasing agents may or may not be included in the treatment fluid.

Diutan

Diutan gum (commonly referred to simply as diutan) is a multi-chain polysaccharide that is sometimes used to increase viscosity in well fluids.

In general, diutan is a polysaccharide which may be prepared by fermentation of a strain of sphingomonas. Diutan may also be referred to as a polysaccharide designated S-657 or S-8 in some literature. Its structure has been elucidated as having a repeat unit of a hexasaccharide with a tetrasaccharide repeat unit in the backbone that comprises glucose and rhamnose units and a di-rhamnose side chain. Details of the diutan gum structure may be found in an article by Diltz et al., "Location of O-acetyl Groups in S-657 Using the Reductive-Cleavage Method," Carbohydrate Research, Vol. 331, pp. 265-270 (2001). Details of preparing diutan gum may be found in U.S. Pat. No. 5,175,278, which is incorporated by reference. It is believed to have thickening, suspending, and stabilizing properties in aqueous or non-aqueous solutions.

Clarified Diutan

The term "clarified diutan" as used herein refers to a diutan that has improved turbidity or filtration properties as compared to non-clarified diutan. In some embodiments, suitable clarified diutans may have been treated with enzymes or the like to remove residual cellular structures, such as cell walls. In some embodiments, suitable clarified diutans may be produced from genetically modified or bioengineered strains of bacteria or other strains of bacteria that allow the clarified diutan to have improved functional properties such as filterability, turbidity, etc.

In some embodiments, the viscosity-increasing agents suitable for use in the methods of the present invention may comprise a clarified diutan, wherein the clarified diutan at a 0.1% concentration in deionized water, in a 1 cm optical cell, has a transmittance at 350 nanometers ("nm") wavelength of at least about 20%. In some embodiments, the clarified diutan has a transmittance of at least about 25%. In some embodiments, the clarified diutan has a transmittance of at least about 30%. In some embodiments, the clarified diutan has a transmittance of at least about 40%. In some embodiments, the clarified diutan has a transmittance of at least about 50%. In some embodiments, the clarified diutan has a transmittance of at least about 60%. In some embodiments, the clarified diutan has a transmittance of at least about 70%. In some embodiments, the clarified diutan has a transmittance of at least about 80%. In some embodiments, the clarified diutan has a transmittance of at least about 90%. One of ordinary skill in the art with the benefit of this disclosure will recognize that the transmittance of any particular treatment fluid may also vary depending on the addition of certain additives, the composition of the treatment fluid, the degree of hydration of the diutan, the temperature, and the pH of the treatment fluid.

Additional information regarding clarified diutan may be found in U.S. Patent Publication Nos. 2008/0194427, 2008/0194428, 2008/0194430, each published Aug. 14, 2008, each having for named inventors Thomas D. Welton, Richard W. Pauls, Lulu Song, Jason E. Bryant, Sean R. Beach; and Ian D. Robb, and each entitled "Treatment Fluids Comprising Diutan and Associated Methods," the entire disclosure of which is incorporated herein by reference.

Diutan Derivative

In one embodiment, the diutan or clarified diutan may be modified by genetic engineering or bacteria selection or the result of chemical treatment or derivatization of a diutan. An example of such a modification would be where a portion of the diutan is oxidized or hydrolyzed. Suitable clarified diutan may also be present in a form that will only partially hydrate or will not hydrate at ambient temperature. This form of clarified diutan may be chemically modified, chemically coated, genetically modified, or produced from a new strain of bacteria.

Concentrations

In some embodiments, the viscosity-increasing agents suitable for use in the methods of the present invention may comprise a clarified diutan, wherein the clarified diutan at a 0.1% concentration in deionized water, in a 1 cm optical cell, has a transmittance at 600 nanometers ("nm") wavelength of at least about 65%. In some embodiments, the clarified diutan may have a transmittance of at least about 75%. In some embodiments, the clarified diutan may have a transmittance of at least about 85%. One of ordinary skill in the art with the benefit of this disclosure will recognize that the transmittance of any particular treatment fluid may also vary depending on the addition of certain additives, the composition of the treatment fluid, the degree of hydration of the diutan, the temperature, and the pH of the treatment fluid.

Sources of Diutan

A suitable source of a diutan is "GEOVIS XT," which is commercially available from Kelco Oil Field Group, Houston, Tex. Another suitable source of a diutan is "FDP-S848-07" and "FDP-S849-07," both of which are available from Halliburton Energy Services, Duncan, Okla. Other examples of suitable sources of a diutan may include those disclosed in U.S. Pat. No. 5,175,278 and U.S. Patent Publication Nos. 2006/0121578, 2006/0199201, 2006/0166836, 2006/0166837, and 2006/0178276, which are herein incorporated by reference.

Advantages of Diutan, Clarified Diutan, or Derivatized Diutan

A fluid viscosified with a diutan or derivatized diutan can enable a substantial amount of design flexibility for a number of applications that would benefit using a shear-thinning, low-damage fluid system including, for example, gravel packing, fluid loss control, and friction pressure reduction.

A fluid viscosified with a diutan or derivatized diutan can enable a simple mixing procedure and rapid viscosity development in a number of water-based fluids including for example, fresh water, potassium or sodium chloride brines, and sodium bromide brines. The polymer can be rapidly dispersed in an aqueous phase without going through a complex mixing protocol or an extended hydration period. Its ease of mixing and rapid hydration apply to seawater and monovalent brines used in completion operations.

Diutan viscosified fluid can provide excellent particulate suspension under static conditions at temperatures up to 270° F. (132.2° C.). It is a shear thinning fluid that has relatively low viscosity at high shear rates and high viscosity at low shear rates, which is useful in many types of treatment applications.

Because such fluids have high viscosity under low shear conditions, it can be useful to suspend particulates similar to a fluid viscosified with a cross-linked polymer. In addition, the high viscosities under low shear attained with these polymer loadings can be used to help control fluid losses during workover and completion operations with reduced damage to the formation.

At lower polymer concentrations, a fluid with diutan or a derivative can produce a "slick water" or "slick brine" consistency to help reduce pumping friction pressures.

Form and Concentration

The viscosity-increasing agent comprising diutan may be provided in any form that is suitable for the particular treatment fluid or application of the present invention. In certain embodiments, the viscosity-increasing agent may be provided as a liquid, gel, suspension, or solid additive that is admixed or incorporated into a treatment fluid used in conjunction with the present invention. The viscosity-increasing agent may also be present in a solid particulate form of any size or shape. For example, larger sized particulates of spherical shape may be used, inter alia, to form perforation tunnel blocking particles, similar to perforation pack balls. Similarly, smaller sized particulates may be used, inter alia, as a fluid-loss control material that may act to bridge natural fractures or other channels.

The viscosity-increasing agent should be present in a treatment fluid in a form and in an amount at least sufficient to impart the desired viscosity to a treatment fluid. For example, in some embodiments, the amount of viscosity-increasing agent used in the treatment fluids suitable for use in the present invention may vary from about 0.25 pounds per 1,000 gallons of treatment fluid ("lbs/Mgal") to about 200 lbs/Mgal. In other embodiments, the amount of viscosity-increasing agent included in the treatment fluids suitable for use in the present invention may vary from about 10 lbs/Mgal to about 80 lbs/Mgal. In another embodiment, about 60 lbs/Mgal of a viscosity-increasing agent is included in a treatment fluid suitable for use in the present invention. It should be noted that in well bores comprising bottom hole temperatures of 200° F. or more, 70 lbs/Mgal or more of the viscosity-increasing agent can be beneficially used in a treatment fluid suitable for use in the present invention. In embodiments in which the amount of diutan approaches 200 lbs/Mgal, the diutan may act to increase the viscosity of the treatment fluid so that the treatment fluid may be used as a diverting fluid or fluid loss pill to seal a formation.

Optional Additional Viscosity-Increasing Agent

Optionally, the treatment fluids suitable for use in the methods of the present invention may comprise an additional viscosity-increasing agent other than a diutan or derivative if the use of the diutan and the other viscosity-increasing agent produces a desirable result, e.g., a synergistic effect. In some embodiments, diutan may be used in combination with other viscosity-increasing agents so that the diutan only imparts its viscosity once the treatment fluid has entered the formation to provide viscosity at elevated temperatures where other viscosity-increasing agents may no longer provide adequate viscosity. Suitable additional viscosity-increasing agents may include polysaccharides and galactomannan gums. Depending on the application, one viscosity-increasing agent may be more suitable than another may be. One of ordinary skill in the art with the benefit of this disclosure will be able to determine if an additional viscosity-increasing agent should be included for a particular application based on, for example, the desired viscosity of the treatment fluid and the bottom hole temperature ("BHT") of the well bore.

Optional Viscosity-Increasing Agent Excludes Non-Diutan Polymer Backbones

In an embodiment the continuous aqueous phase of the treatment fluid excludes a viscosity-increasing agent that is not selected from the group consisting of diutan, a clarified diutan, or a water-soluble derivative of diutan. In other words, the aqueous phase excludes a viscosity-increasing agent that does not have a diutan polymer backbone.

Viscosity-Increasing Agent Excludes Cross-Linking Agent

In an embodiment, the aqueous phase of the treatment fluid excludes an effective concentration of a cross-linking agent for the viscosity-increasing agent that would increase the viscosity of the un-crosslinked fluid by more than 10%. In another embodiment, the treatment fluid excludes a crosslinking agent for the viscosity-increasing agent. In yet another embodiment, the viscosity-increasing agent is not cross-linked.

Viscosity-Increasing Agent Contributes to Desired Viscosity

The viscosity of the treatment fluid is equal or greater than 5.0 cP. In an embodiment, the viscosity of the treatment fluid is equal or greater than 10 cP. In an embodiment, the viscosity of the treatment fluid is equal or greater than 20 cP. In an embodiments, the viscosity of the treatment fluid is equal or greater than 50 cP.

Breaker Including Oxalic Acid

The breakers suitable for use in the present invention generally comprise an acid composition including at least oxalic acid. One skilled in the art, with the benefit of this disclosure, will recognize the amount and type of breaker suitable for a particular application of the present invention.

The acid composition may be present in the treatment fluid in an amount at least sufficient to decrease the viscosity of a treatment fluid comprising the viscosity-increasing agent. The amount and composition of the acid composition utilized in the present invention may depend upon a number of factors, including the composition or temperature of the formation, the type or amount of viscosity-increasing agents used, the type or amount of crosslinking agent used if any, the pH of the treatment fluid, the pH buffering properties of substances native to a subterranean formation in which the treatment fluid is used, and the like. If reaction time is a concern, holding all other factors constant, generally the viscosity of the treatment fluid may decrease at a faster rate as the concentration of the acid composition in the breaker is increased (e.g., as the pH is lowered). In embodiments in which the treatment fluid has particulates suspended therein, the amount of breaker used may also depend on the length of time the user desires the treatment fluid to support the particulates.

In an embodiment, the treatment fluid comprises oxalic acid dissolved in the continuous aqueous phase in a concentration between 0.1% by weight and 1% by weight. In an embodiment, essentially all of the oxalic acid in the treatment fluid is dissolved in the aqueous phase.

Treatment Fluid Excluding an Acid Having Undesirable Properties

In an embodiment, the continuous aqueous phase of the treatment fluid has less than 0.1% by weight of the water of any acid with properties selected from the group consisting of:
  a $pKa1<1$,
  a $pKa1>2$,
  a flash point$>200°$ F.,
  a flammability rating$>1$ on the National Fire Protection Association ("NFPA") scale,
  a reactivity rating$>0$ on the NFPA scale,
  with any risk phrase ratings (through the year 2010), or
  fuming at standard laboratory conditions.
In an embodiment, the treatment fluid excludes any measurable concentration of such acid.

In an embodiment, the treatment fluid comprises one or more acids other than oxalic acid, however, the other acids are in a form or concentration that are not effective to break the viscosity of the treatment fluid at a temperature between 180° F. and 220° F. in less than 24 hours.

Additional Breaker Component

In certain embodiments of the present invention, the breaker may comprise a combination of an acid composition and an "additional breaker component," which herein refers to any other breaker known in the art that does not negatively impact the acid component of the breaker composition. Examples of suitable additional breakers include, but are not limited to, oxidizers or enzymes. Examples of oxidizing breakers include sodium chlorite, sodium bromate, and the like. In certain embodiments of the present invention, the breaker may be formulated to remain inactive until it is "activated" by, among other things, certain conditions in the fluid (e.g., pH, temperature, etc.) or contact with some other substance.

Without Oxidizing Breaker

In an embodiment, the treatment fluid excludes an effective amount of an oxidizing breaker to break the viscosity-increasing agent before the step of flowing back. In another embodiment, the treatment fluid does not include an oxidizing breaker in a concentration that is effective to break the treatment fluid at a temperature between 180° F. and 220° F. in less than 24 hours. In another embodiment, the treatment fluid does not include any oxidizing breaker.

pH and pH Adjuster

Preferably, the pH of the continuous aqueous phase of the treatment fluid is in the range of 1 to 3.

In certain embodiments, the treatment fluids of the present invention can comprise a pH-adjuster (other than the oxalic acid). Preferably, the pH adjuster does not have undesirable properties, as discussed above. Preferably, the oxalic acid and the pH-adjuster are present in an amount sufficient to maintain or adjust the pH of the fluid to a pH in the range of from about 1 to about 5.

The pH-adjuster may be present in the treatment fluids suitable for use in the present invention in an amount sufficient to maintain or adjust the pH of the fluid. In some embodiments, the pH-adjuster may be present in an amount sufficient to maintain or adjust the pH of the fluid to a pH in the range of from about 1 to about 5. In other embodiments, the pH-adjuster may be present in an amount sufficient to maintain or adjust the pH of the fluid to a pH in the range of from about 1 to about 4, or in the range of from about 2 to about 4.

In general, a pH-adjuster may function, inter alia, to affect the hydrolysis rate of the viscosity-increasing agent. In some embodiments, a pH-adjuster may be included in the treatment fluid, inter alia, to adjust the pH of the treatment fluid to, or maintain the pH of the treatment fluid near, a pH that balances the duration of certain properties of the treatment fluid (e.g. the ability to suspend particulate) with the ability of the breaker to reduce the viscosity of the treatment fluid or a pH that will result in a decrease in the viscosity of the treatment fluid such that it does not hinder production of hydrocarbons from the formation.

In certain embodiments, the pH-adjuster comprises a salt of an organic acid such as sodium or potassium formate, sodium or potassium acetate, sodium or potassium citrate, sodium or potassium glycolate, sodium or potassium maleate, sodium or potassium phosphate, potassium dihydrogen phosphate, cesium formate, and any combinations thereof. In some embodiments, the pH-adjuster may comprise a small amount of a strong base such as NaOH, $Na_2CO_3$, and $Mg(OH)_2$. In other embodiments, the pH-adjuster may be any other substance known in the art capable of maintaining the pH of the breaker in a limited range. One of ordinary skill in the art, with the benefit of this disclosure, will recognize the appropriate pH-adjuster and amount thereof to use for a chosen application.

Treatment Fluid as Emulsion

If desired, the treatment fluids suitable for use in the present invention may be used in the form of an emulsion. An example of a suitable emulsion would comprise an aqueous base fluid comprising a viscosity-increasing agent that comprises a diutan or derivative, and a suitable hydrocarbon as another phase. In some embodiments, the emulsion may comprise approximately 30% of an aqueous base fluid and 70% of a suitable hydrocarbon. In some embodiments, the external phase of the emulsion would be aqueous. In certain embodiments, it may be desirable to use an emulsion to, inter alia, reduce fluid loss to the subterranean formation, or to provide enhanced particulate suspension. Other benefits and advantages to using emulsions in the methods of the present invention will be evident to one of ordinary skill in the art.

Treatment Fluid as Foamed

In some embodiments, the treatment fluids can be foamed (e.g., a liquid that comprises a gas such as nitrogen or carbon dioxide).

In certain embodiments, it may desirable that the treatment fluid is foamed to, inter alia, reduce the amount of treatment fluid that is required, e.g. in water sensitive subterranean formations, to reduce fluid loss to the subterranean formation, enhance flow back of fluids, or to provide enhanced particulate suspension. In addition, in certain embodiments where the treatment fluids suitable for use in the present invention are used for fluid diversion, it may be desirable that the treatment be foamed.

While various gases can be utilized for foaming the treatment fluids of this invention, nitrogen, carbon dioxide, and mixtures thereof are preferred. In examples of such embodiments, the gas may be present in a treatment fluid suitable for use in the present invention in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application.

Particulate in Treatment Fluid

In an embodiment, the treatment fluid can include a particulate. A particulate, such as gravel, can be used in the present invention. Examples include sand, gravel, bauxite, ceramic materials, glass materials, polymer materials, wood, plant and vegetable matter, nut hulls, walnut hulls, cottonseed hulls, cured cement, fly ash, fibrous materials, composite particulates, hollow spheres or porous particulate. It should be understood that the term "particulate," as used in this disclosure, includes all known shapes of materials including substantially spherical materials, oblong, ellipsoid, rod-like, polygonal materials (such as cubic materials), mixtures thereof, and the like.

In some embodiments in which the treatment fluid comprises particulates, the treatment fluid may be capable of suspending at least a portion of the particulates contained therein. Treatment fluids comprising particulates may be used in any method known in the art that requires the placement of particulates in a subterranean formation. For example, treatment fluids of the present invention that comprise particulates may be used, inter alia, to form a gravel pack in or adjacent to a portion of the subterranean formation.

Other Well Fluid Additives

In certain embodiments, the treatment fluids suitable for use in the methods of the present invention also can optionally comprise other commonly used well fluid additives, such as those selected from the group consisting of surfactants, bactericides, fluid loss control additives, stabilizers, chelants, scale inhibitors, corrosion inhibitors, hydrate inhibitors, clay stabilizers, salt substitutes (such as trimethyl ammonium chloride), relative permeability modifiers (such as HPT-1™ commercially available from Halliburton Energy Services, Duncan, Okla.), sulfide scavengers, fibers, nanoparticles, and any combinations thereof.

It should be understood, however, that in an embodiment the treatment fluid does not include hydraulic cement and the treatment fluid is not a hydraulic cement composition.

Introducing the Treatment Fluid into the Well

As used herein, introducing "into a well" means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly." It should be understood that the step of delivering the treatment fluid into the wellbore can advantageously include the use of one or more fluid pumps.

The treatment fluid may be provided and introduced into the subterranean formation in certain embodiments of the present invention by any means known in the art. In certain embodiments, the treatment fluid may be introduced into the subterranean formation by pumping the treatment fluid into a well bore that penetrates a portion of the subterranean formation.

In an embodiment, the step of introducing comprises introducing under conditions for gravel packing the portion of the wellbore.

In an embodiment, the step of introducing is below the fracture pressure of the portion of the well.

In an embodiment, step of introducing into the portion of the well is at an estimated shear greater than 200/sec, or greater than 300/sec, or greater than 400/sec, or greater than 500/sec.

Flow Back Conditions

In an embodiment, the step of flowing back is within 24 hours of the step of introducing. In another embodiment, the step of flowing back is within 16 hours of the step of introducing.

After Well Treatment, Producing Hydrocarbon from Subterranean Formation

Preferably, after any such well treatment, a step of producing hydrocarbon from the subterranean formation is the desirable objective.

EXAMPLES

To facilitate a better understanding of the present invention, the following examples of certain aspects of some embodiments are given. In no way should the following examples be read to limit, or define, the entire scope of the invention.

Short Break Times at 180° F. and 200° F.

The following examples illustrate the breaking of a diutan using dissolved oxalic acid at temperatures in the range of 180° F. to 220° F. Preliminary testing has been conducted to confirm the breaking of diutan to very low viscosities 3 cP (at 511 sec$^{-1}$ shear on a Fann 35 viscometer) in less than 12 hours at 183° F.

Breaking tests are shown in Table 1 for a 50 lb/Mgal diutan hydrated in water with 3% KCl, which provides a fluid having an initial viscosity of 51 cP.

TABLE 1

| Acid Conc. | 160° F. Oxalic acid | 180° F. Oxalic acid | 200° F. Oxalic acid | 200° F. Formic acid |
|---|---|---|---|---|
| 0.48% | Broken (<3 cP) in 3 days | Broken (2 cP) in 10 hours | Broken (1 cP) in 5 hours | Unbroken 20 cP after 3 days |
| 0.24% | Unbroken 19 cP after 3 days | Unbroken 14 cP in 24 hours | Broken (1 cP) in <15 hours | Unbroken 19 cP after 4 days |
| 0.12% | — | — | Unbroken 14 cP After 2 days (46 hours) | Unbroken 20 cP after 7 days |
| 0.06% | — | — | Unbroken 17 cP after 2 days (49 hours) | Unbroken 21 cP after 7 days |

Table 1 shows that oxalic acid can effectively break a 50 lb/Mgal diutan fluid to a very low viscosity of less than 3 cP at low temperature of 180° F. or 200° F. Breaking with dissolved oxalic acid at 160° F. is too slow and incomplete. Breaking with formic acid at 200° F. is also too slow or incomplete. Formic acid, even at 200° F., cannot provide a break after 3 days.

In addition, the breaker system at 1% concentration can achieve very low viscosity of less than 3 cP within a very short time of less than 12 hours at 183° F. The added advantage of this breaker is the use of concentrations lower than 1% to achieve short break times at temperatures between 185° F. and 220° F., making it practical for field applications. At temperatures higher than 183° F., the activity of oxalic acid is higher and hence break times shorter than 12 hours are likely to be achieved with 1% breaker concentrations, if required.

Sand Settling Tests

With 0.48% oxalic acid as breaker, sand settling with 6 ppg 20/40 mesh Carbolite™ lightweight ceramic particulate (commercially available from Carbo Ceramics, Inc. of Houston, Tex.), loading at 160° F. and 180° F. showed only 1% clear fluid in 30 minutes.

CONCLUSION

Therefore, the present invention is well adapted to attain the ends and advantages mentioned as well as those that are inherent therein.

The particular embodiments disclosed are illustrative only, as the present invention may be modified and practiced in different but equivalent manners apparent to those skilled in the art having the benefit of the teachings herein. The various steps according to the disclosed elements or steps can be combined advantageously or practiced together in various combinations to increase the efficiency and benefits that can be obtained from the invention. Such variations and combinations are considered within the scope and spirit of the present invention.

The invention illustratively disclosed herein suitably may be practiced in the absence of any element or step that is not specifically disclosed or claimed.

Furthermore, no limitations are intended to the details of construction or design herein shown, other than as described in the claims.

What is claimed is:

1. A method of treating a portion of a well, the method comprising the steps of:
 (a) forming a treatment fluid comprising:
  (i) a continuous aqueous phase comprising water;
  (ii) a viscosity-increasing agent selected from the group consisting of diutan, clarified diutan, water-soluble derivative of diutan, and any combination thereof, wherein the viscosity-increasing agent is dissolved in the aqueous phase to an extent of at least 0.1% by weight of the water; and
  (iii) a breaker comprising oxalic acid, wherein the oxalic acid is dissolved in the aqueous phase to an extent of at least 0.1% by weight of the water;
  wherein the viscosity-increasing agent is not cross-linked;
  wherein the treatment fluid does not include a cross-linking agent for the viscosity-increasing agent;
  wherein the viscosity of the treatment fluid is equal to or greater than 5.0 cP; and
  wherein the viscosity of the treatment fluid breaks to less than 3.0 cP in less than 72 hours when in a temperature range of 180° F. (82.2° C.) to 220° F. (104.4° C.);
 (b) introducing the treatment fluid into the portion of the well, wherein a temperature of the portion of the well is greater than 180° F. (82.2° C.); and
 (c) flowing back from the portion of the well,
  wherein the step of flowing back is within 72 hours of the step of introducing, and
  wherein the step of flowing back is before contacting the portion of the well with any different treatment fluid that is reactive to degrade the viscosity-increasing agent of the treatment fluid.

2. The method according to claim 1, wherein the aqueous phase comprises inorganic salt dissolved in the continuous aqueous phase to an extent of at least 1% by weight of the water.

3. The method according to claim 1, wherein the viscosity-increasing agent is present in a range of 0.25 lb/Mgal to 200 lb/Mgal of the aqueous phase of the treatment fluid.

4. The method according to claim 1, wherein the viscosity-increasing agent comprises an agent selected from the group consisting of diutan, clarified diutan, and any combination thereof.

5. The method according to claim 1, wherein the viscosity of the treatment fluid is in a range of 10 cP to 5,000 cP.

6. The method according to claim 1, wherein the treatment fluid comprises oxalic acid in a concentration between 0.1% by weight and 1% by weight of the water of the aqueous phase.

7. The method according to claim 1, wherein the viscosity of the treatment fluid breaks to less than 3.0 cP in less than 24 hours when in a temperature range of 180° F. (82.2° C.) to 220° F. (104.4° C.).

8. The method according to claim 1, wherein the treatment fluid does not contain any undesirable acid dissolved in the aqueous phase in a concentration greater than 0.1% by weight of the water of the aqueous phase, wherein an undesirable acid is an acid selected from the group consisting of:
 an acid having a pKa(1)<1,
 an acid having a pKa(1)>2,
 an acid having a flash point>200° F., and
 an acid that fumes at standard laboratory conditions.

9. The method according to claim 1, wherein the pH of the continuous aqueous phase of the treatment fluid is in a range of 1 to 3.

10. The method of claim 1, wherein the breaker further comprises a pH-adjuster other than oxalic acid.

11. The method according to claim 1, wherein the treatment fluid does not contain a viscosity-increasing agent other than the viscosity-increasing agent selected from the group consisting of diutan, clarified diutan, or a water-soluble derivative of diutan.

12. The method according to claim 1, wherein the treatment fluid comprises acid with a pKa less than 2 other than oxalic acid, wherein the other acid is in a concentration that is not effective to break the viscosity of the treatment fluid at a temperature between 180° F. and 200° F. in less than 24 hours.

13. The method according to claim 1, wherein the treatment fluid does not include an effective amount of an oxidizing breaker to break the viscosity-increasing agent before the step of flowing back.

14. The method according to claim 1, wherein the treatment fluid does not include a hydraulic cement.

15. The method according to claim 1, wherein the treatment fluid comprises gravel.

16. The method according to claim 1, wherein the step of introducing comprises introducing under conditions for gravel packing the portion of the wellbore.

17. The method according to claim 1, wherein the step of introducing is below a fracture pressure of the portion of the well.

18. The method according to claim 1, wherein the step of flowing back is at least 0.5 hour after the step of introducing.

19. The method according to claim 1, wherein the step of flowing back is within 24 hours of the step of introducing.

* * * * *